Aug. 25, 1953     H. T. KOBAYASHI     2,649,787
SCRATCH MARKER FOR MEASURING TAPE

Filed May 12, 1950

Harry T. Kobayashi
INVENTOR.

Patented Aug. 25, 1953

2,649,787

UNITED STATES PATENT OFFICE 2,649,787

SCRATCH MARKER FOR MEASURING TAPE

Harry T. Kobayashi, Honolulu, Territory of Hawaii, assignor of fifty per cent to Sally Kobayashi, Honolulu, Territory of Hawaii Application May 12, 1950, Serial No. 161,523

1 Claim. (Cl. 33—189)

The present invention relates to mark making means for use in association with a measuring tape whereby when one end of the tape is temporarily anchored on a relatively fixed work or equivalent surface a work layout mark may be quickly made in a manner to obviate the need for a pencil, separate scriber or the like.

As a general rule fabric, steel and other graduated measuring tapes are wound on a reeling drum in a suitable housing provided therefor. The housing is of a pocket size type, as a general proposition, and there is a slot or the like provided in the peripheral portion of the casing through which the free end of the tape is paid out for making measurements and laying out jobs, etc. Ordinarily, when the user desires to make a mark on the work surface he does so with a pencil, scriber, nail or whatever he has handy and in readiness for such purpose. The objective in the instant matter is to obviate the necessity for using separate marking implements and to provide the marker directly on the reeled tape containing casing.

Briefly summarized, the results desired are attained by providing what I call a scratch marker. This is a simple projection on one marginal wall of the casing, the projection being so fashioned that it will serve to produce a marking scratch on a work surface to denote the measurement ranging, let us say, from the initial graduation mark on the measuring tape to a distant mark on the same tape.

With a view toward assuring reliable results attainable with speed and accuracy, novelty is predicated on a reeled tape containing case wherein two adjacent marginal edges are substantially flat and at right angles to each other and wherein one edge has a tape slot in close proximity and parallel with the other edge and wherein the latter edge is provided with the projecting lug which constitutes the scratch marker.

Other objects and advantages will become more readily apparent from the following description and the accompanying illustrative drawings.

In the accompanying sheet of drawings wherein like numerals are employed to designate like parts through the views.

Figure 1:
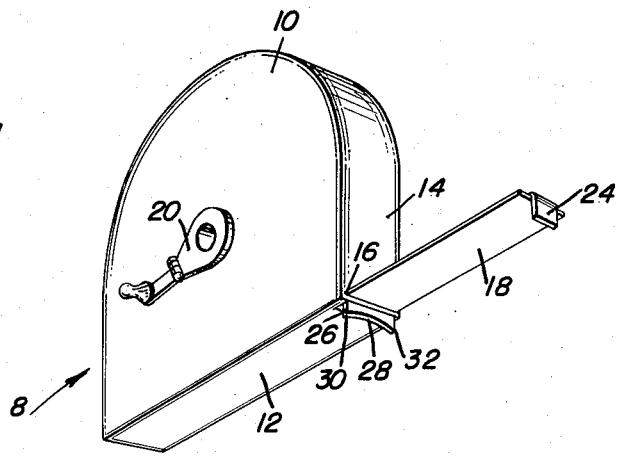
Figure 1 is a perspective view of a measuring tape constructed in accordance with the principles of the present invention and disclosing the manner in which the same may be used.
Figure 2:
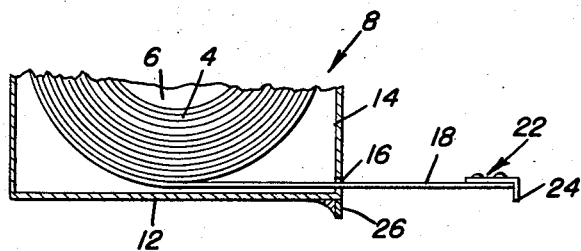
Figure 2 is a fragmentary view in section and elevation which brings out certain of the details with particularity.
Figure 3:
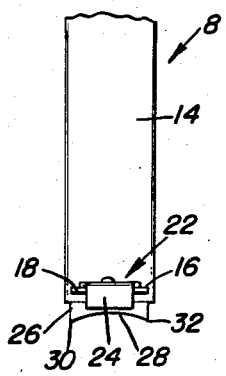
Figure 3 is an edge view, also fragmentary in type, showing the relationship and relative appearance of the complemental elements.

The measuring tape 4 is coiled or reeled on an appropriate drum or equivalent reel structure 6 and is essentially, when not in use, confined in the chamber in the sheet metal or equivalent protective case 8. The general body portion of the case may be of any appropriate dimensions and shape. I am primarily interested however in assuring that the case shall be flat bottomed as at 12 and that the coacting marginal wall 14 shall be equally flat with the two walls at right angles to each other with the wall 14 provided with a slot 16 for the free end portion 18 of the tape. Any appropriate winding means for the reel or drum may be provided as at 20 in Figure 1. Any suitable L-shaped or similar clip 22 may be secured to the free end of the tape and provided with a temporary anchoring hook 24, the latter to be engaged over the edge of an object or any convenient portion of the work piece so that one end of the tape may be held while the casing of the reel may be drawn along in the usual way with the tape in contact with the workpiece for measurement taking purposes. Since measuring tapes and equivalent so-called flexible rulers are so well known it is unnecessary to dwell upon the general construction of same or the mode of using the available features thereof. So far, the novelty relied upon would be in the casing or housing for a roll or reel of tape with the tape emerging at its free end through a slot which is parallel to the bottom, the bottom 12 here being flat and at right angles to the end wall 14. The other feature has to do with the scratch marker which takes the form of a short projecting lug 26 which is welded or otherwise mounted on the exterior of the bottom wall 12 at the exact juncture between the walls 12 and 14. This lug is in fact flush with the wall 14 and approximately the same length as the slot 16. The intermediate portion of the marker edge is curved slightly as at 28 to provide suitable markers 30 and 32. The features 22, 14, 12, 16 and 26 coordinate their facilities and structural coordination in making it easily possible for the user to employ a simple marker lug or a casing of predetermined shape for purposes of making vivid scratches on a work piece for measurement taking purposes.

It is to be understood that although the container for the reeled tape has been referred to as a tape, any suitable holder may be utilized and my claim is to be construed accordingly.

Having described the invention, what is claimed as new is:

A measuring tape construction of the class described comprising a hollow case having at least two flat marginal wall portions, said wall portions being at right angles to each other, one wall portion having a transverse tape slot, said slot being in close proximity to and substantially parallel with one end of the other wall portion, said other wall portion being provided at its said one end with an integral scribing lug, said lug being disposed transversely of said one end flush with said one wall portion and depending at right angles to said other wall portion, said lug extending flush with the opposed longitudinal edges of the tape when the tape is extended beyond the slot, the lower edge of said lug being notched intermediate its ends to provide prominent scratch markers at the respective ends.

HARRY T. KOBAYASHI.

References Cited in the file of this patent

UNITED STATES PATENTS

| Number | Name | Date |
|---|---|---|
| 812,322 | Badger | Feb. 13, 1906 |
| 1,434,528 | Crogan | Nov. 7, 1922 |
| 1,878,673 | Carufel | Sept. 20, 1932 |
| 1,986,551 | Anderson | Jan. 1, 1935 |

FOREIGN PATENTS

| Number | Country | Date |
|---|---|---|
| 67,109 | Sweden | Sept. 24, 1925 |